J. HUGHES.
MACHINE FOR REPAIRING BOILER FLUES.
No. 106,589. Patented Aug. 23, 1870.
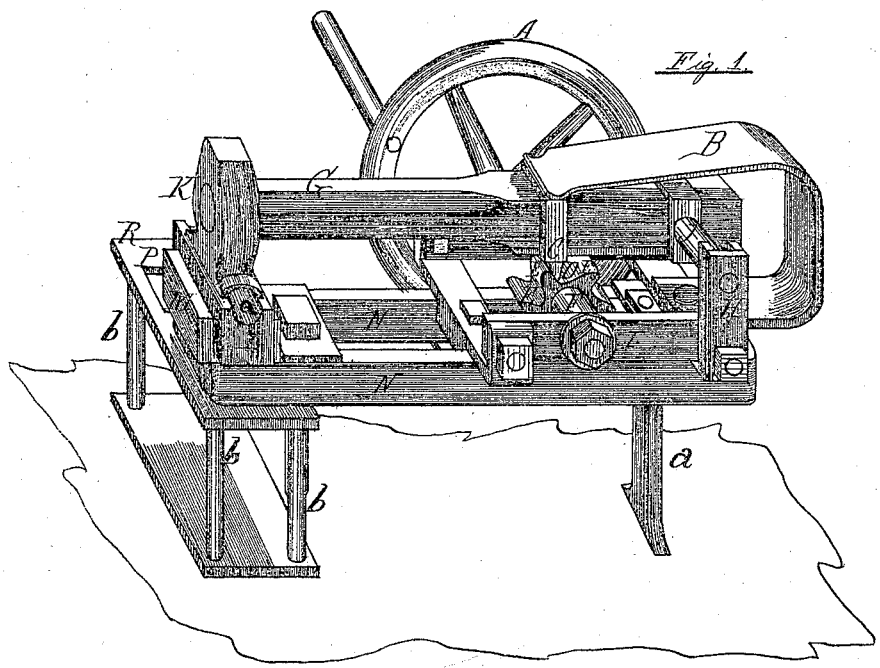
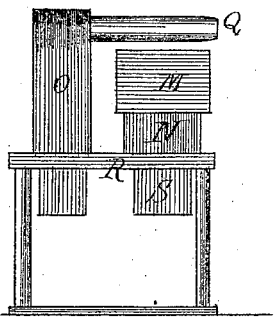

United States Patent Office.

JOSEPH HUGHES, OF BLOOMINGTON, ILLINOIS.

Letters Patent No. 106,589, dated August 23, 1870.

IMPROVED MACHINE FOR REPAIRING BOILER-FLUES.

The Schedule referred to in these Letters Patent and making part of the same.

*To all whom it may concern:*

Be it known that I, JOSEPH HUGHES, of Bloomington, in the county of McLean and State of Illinois, have invented a new and useful Improvement in Machine for Repairing Boiler-Flues or Tubes; and I do hereby declare that the following is a full and exact description thereof, which will enable those skilled in the art to make and use the same, reference being had to the accompanying drawing and letters marked thereon, making a part of this specification, in which—

Figure 1 is a perspective representation of a machine exhibiting my invention.

Figure 2, a detached end elevation of the same.

The present invention relates to an improved machine for repairing boiler-flues or tubes. In removing flues from boilers they are necessarily shortened, so that short pieces have to be welded to their ends, and it is our object to facilitate the manufacture of these short pieces, in order to save labor, while, at the same time, the work is done in a superior manner.

N N represent a substantial frame, which is supported above a floor or foundation, at a proper height, by means of a pedestal, a, at one end, and a series of posts, b, and platform, R, at the other end, said frame being secured to the floor or foundation by means of rods or bolts, as most convenient.

To the frame N N is attached an adjustable carriage, I, which is provided with a cross-tree that passes down between the frame, and fastens by bolts below, so that, by loosening the nuts below, the carriage may be moved to and from a die, L.

A shaft, F, has bearings in the elevated sides of carriage I, and it supports a lifting ratchet, E, which raises a hammer-beam, G, said shaft being driven by a crank-wheel, A, by hand power, or by other means most desirable. Hand power, however, I consider the most convenient, as the machine can be handled to better advantage when so used.

The end of carriage I is provided with a stirrup, H, which has bearings in it to support the arms J of a hammer-beam, G, and to which is attached the lower end of a curved spring, B, which forces down the hammer-beam G, after it has been raised up by one of the cogs E of the lifting-ratchet E, said spring being made of one or more leaves, as strength may be required.

To the opposite end of the frame N N to that on which the spring is, there is attached a metal die-seat, M, in which is fastened a die, L, answering the purpose of an anvil, which is provided with a semicircular groove to receive the lower part of the tube or pipe, to be formed and molded in the usual manner.

The end of the hammer-beam G is provided with a hammer, which is grooved out on its face, and arranged by means of the adjustable carriage to strike directly over the groove in die L, as shown in fig. 1. The die-seat L is keyed fast to the under side of the platform R, and to the same platform is keyed fast the standard O, of a forming spindle, Q. At Figures 1 and 2 this standard is so placed in the platform as to bring the spindle over the groove in the die L, but it may be so placed in the platform that the spindle will be parallel with the frame N, and thus be out of the way of the die L and seat M, when either one is to be removed.

The operation is very simple, requiring only that the sections of formed pipe be placed, at a welding heat, on spindle Q, and welded as they are turned or rotated in the usual manner.

Claims.

1. The attachment of the mandrel Q to a standard, O, that may be adjusted on the platform R, so that the mandrel shall lie over and parallel with the die L, or may be made to turn in either direction away from said die, as set forth.

2. In combination with the die, mandrel, and adjustable standard, set forth in the above claim, the hammer and helve K G, spring B, and lifting-ratchet or tappet-wheel E, as and for the purpose set forth.

JOSEPH HUGHES.

Witnesses:
WM. HUGHES,
RICHARD PARRY.